US 11,923,774 B2

(12) United States Patent
Hosotani

(10) Patent No.: US 11,923,774 B2
(45) Date of Patent: Mar. 5, 2024

(54) SWITCHING POWER SUPPLY APPARATUS

(71) Applicant: Murata Manufacturing Co., Ltd., Kyoto-fu (JP)

(72) Inventor: Tatsuya Hosotani, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 254 days.

(21) Appl. No.: 17/647,269

(22) Filed: Jan. 6, 2022

(65) Prior Publication Data

US 2022/0131464 A1    Apr. 28, 2022

Related U.S. Application Data

(63) Continuation of application No. PCT/JP2020/005034, filed on Feb. 10, 2020.

(30) Foreign Application Priority Data

Jul. 9, 2019  (JP) .................... 2019-127565

(51) Int. Cl.
*H02M 3/155*    (2006.01)
*H02M 1/00*     (2006.01)
*H02M 3/158*    (2006.01)

(52) U.S. Cl.
CPC ......... *H02M 3/158* (2013.01); *H02M 1/0009* (2021.05)

(58) Field of Classification Search
CPC .... H02M 3/158; H02M 1/0009; H02M 3/156; H02M 3/155
See application file for complete search history.

(56) References Cited

U.S. PATENT DOCUMENTS

| 5,877,611 A | 3/1999 | Brkovic |
| 5,982,160 A * | 11/1999 | Walters ................. H02M 3/156 323/222 |

(Continued)

FOREIGN PATENT DOCUMENTS

| JP | 2000-227808 A | 8/2000 |
| JP | 2003-052170 A | 2/2003 |

(Continued)

OTHER PUBLICATIONS

International Search Report issued in PCT/JP2020/005034; dated Mar. 31, 2020.

(Continued)

*Primary Examiner* — Adolf D Berhane
(74) *Attorney, Agent, or Firm* — Studebaker & Brackett PC

(57) ABSTRACT

A switching power supply apparatus includes switching elements that generate switching current flowing through an inductor, a switching control circuit, and an inductor current detection circuit that detects current flowing through the inductor. The inductor current detection circuit is composed of a time constant circuit including a detection capacitor and a detection resistor that are connected in series to each other and is connected in parallel to the inductor. A time constant of the inductor current detection circuit has characteristics varied with frequency or temperature. This compensates variation of equivalent series resistance of the inductor with respect to the frequency or variation thereof with respect to the temperature.

20 Claims, 10 Drawing Sheets

(56) References Cited

U.S. PATENT DOCUMENTS

| | | | |
|---|---|---|---|
| 8,368,368 B2* | 2/2013 | Qiu | H02M 3/156 |
| | | | 323/222 |
| 2021/0408916 A1* | 12/2021 | Sakamoto | H02M 1/36 |
| 2022/0131467 A1* | 4/2022 | Hosotani | H02M 3/1586 |
| 2023/0361683 A1* | 11/2023 | Hosotani | H02M 1/0025 |

FOREIGN PATENT DOCUMENTS

| | | |
|---|---|---|
| JP | 2009-145277 A | 7/2009 |
| JP | 2014-506776 A | 3/2014 |
| JP | 2014-103842 A | 6/2014 |

OTHER PUBLICATIONS

Written Opinion of the International Searching Authority issued in PCT/JP2020/005034; dated Mar. 31, 2020.

* cited by examiner

SWITCHING POWER SUPPLY APPARATUS

CROSS-REFERENCE TO RELATED APPLICATIONS

This application claims benefit of priority to International Patent Application No. PCT/JP2020/005034, filed Feb. 10, 2020, and to Japanese Patent Application No. 2019-127565, filed Jul. 9, 2019, the entire contents of each are incorporated herein by reference.

BACKGROUND

Technical Field

The present disclosure relates to a switching power supply apparatus including an inductor and an inductor current detection circuit that detects switching current flowing through the inductor.

Background Art

In switching power supply apparatuses, detection of current flowing through inductors with high accuracy is increased in importance. For example, a power supply apparatus that supplies power supply voltage for a processor is required to have lower voltage and higher current with the decreasing operation voltage of the processor. In such a power supply apparatus outputting high current, high current flows through the inductor in the power supply apparatus. Accordingly, a technology is required to detect high inductor current with high accuracy and with low power loss against variation in input voltage or a load, variation in temperature, and so on.

Detection of inductor current with high accuracy enables (1) output current to be limited to protect the circuit against output short circuit and overload. In addition, (2) creation of a current mode control loop to stably control the output at high speed, (3) current balancing by current sharing between the phases of a multi-phase converter, (4) realization of adaptive voltage positioning (AVP) of a microprocessor core power supply, (5) remote measuring of load current, (6) execution of monitoring of a host controller or a microprocessor, and so on are available.

A circuit that detects a voltage drop of a resistor connected in series to a current path is exemplified as a circuit configuration to detect current. For example, although such a circuit may be a solution for accurate current detection in the case of low current of 10 A or low, the circuit is not practical in the case of high current in consideration of the circuit size and the power loss. Use of a circuit element composing a power conversion circuit for the current detection with low power loss is advantageous to high power density and low cost.

However, the circuit configuration using the circuit element in the power conversion circuit has several problems. For example, in a circuit that uses the on resistance of a switching element for the current detection in a step-down converter or a step-up converter, the initial allowable error of the on resistance is large (normally, ±30%) and a resistive element (a silicon diode or an aluminum or copper connection portion) of a metal-oxide-semiconductor field-effect transistor (MOSFET) has a unique variation to temperature. Accordingly, the current is not accurately detected by only detecting the voltage between both ends of the on resistance of a low-side MOSFET. The current detection is available only when the low-side MOSFET is electrically connected and the current detection is unavailable during an on period of a high-side MOSFET.

In contrast, with a technology to use direct-current resistance (DCR) of an inductor for the current detection, such as the one disclosed in U.S. Pat. No. 5,877,611, the tolerance is relatively low (normally defined as ±8%). Such a technology is used for a DC-DC converter for a point-of-load (POL) application. Use of the technology to detect the current from the voltage between both ends of the inductor is considered also in detection of input current of a single-phase boost converter and a multi-phase boost converter for automobiles, industries, and audios. Such a technology attracts attention as the useful one.

SUMMARY

The technology that uses the direct-current resistance (DCR) of the inductor for the current detection has a problem in that the accuracy of the current detection is greatly decreased when the input voltage or a load in the power conversion circuit is varied. In other words, since variation in input voltage or a load causes the waveform of the current flowing through the inductor to be varied, the accuracy of the current detection is decreased. Although a current detection signal can be corrected in accordance with the variation in input voltage or a load, the circuit is increased in size and is made complicated and the power efficiency is reduced due to an occurrence of power consumption in a peripheral circuit to greatly reduce the usefulness.

In addition, when the power conversion circuit operates to cause heat generation in the inductor or variation in ambient temperature of the inductor, there is a problem in that the accuracy of the current detection is greatly decreased. Although the current detection signal can be corrected in accordance with the temperature of the inductor or the variation of the ambient temperature of the inductor in order to resolve this problem, the circuit is increased in size and is made complicated and the power efficiency is reduced due to an occurrence of power consumption in the peripheral circuit to greatly reduce the usefulness.

Accordingly, the present disclosure provides a simple and compact switching power supply apparatus capable of keeping high current detection accuracy and realizing highly efficient power conversion with a simple circuit configuration using a small number of components even if variation in input voltage or a load, variation in a switching frequency, heat generation in the inductor, variation of the ambient temperature of the inductor, or the like occurs.

A switching power supply apparatus as an example of the present disclosure includes an inductor that is connected in series to a current path through which current is supplied to an output portion; a capacitor that is connected in parallel to the output portion; a switching element that generates switching current flowing through the inductor; an inductor current detection circuit that detects current flowing through the inductor; and a switching control circuit that performs switching control of the switching element at a switching frequency in accordance with a result of detection by the inductor current detection circuit. The inductor current detection circuit includes a time constant circuit composed of a detection capacitor and a detection resistor that are connected in series to each other and is connected in parallel to the inductor. A CR product, which is a product of capacitance (C) of the detection capacitor in the time constant circuit and a resistance value (R) of the detection resistor therein, has certain equality relationship with values of inductance and equivalent series resistance of the inductor at the switching frequency. The detection capacitor has frequency characteristics in which the capacitance is decreased with the increasing frequency from the switching frequency, and variation of the resistance value of the equivalent series resistance with respect to the frequency is compensated by the variation in capacitance with respect to the variation in frequency to keep the certain equality relationship from the switching frequency to a high frequency band. The inductor current detection circuit outputs a voltage between both ends of the detection capacitor as an electrical signal with which the current flowing through the inductor is detected.

With the above configuration, the certain equality relationship is kept for increase of the resistance value of the equivalent series resistance of the inductor with respect to the frequency. The variation of the resistance value of the equivalent series resistance with respect to the frequency is compensated by the variation in capacitance with respect to the variation in frequency. Accordingly, even if the waveform of the inductor current is varied to vary the magnitudes or the ratio of harmonic components of the switching frequency, included in the inductor current, the CR time constant of the time constant circuit keeps the certain (constant) equality relationship with the values of the inductance and the equivalent series resistance of the inductor.

Consequently, even if the waveform of the inductor current is varied in response to variation of input voltage or a load to vary the magnitudes or the ratio of the harmonic components with respect to fundamental waves of the switching frequency, the certain equality relationship is kept and reduction in the detection accuracy of the inductor current is small.

A switching power supply apparatus as an example of the present disclosure includes an inductor that is connected in series to a current path through which current is supplied to an output portion; a capacitor that is connected in parallel to the output portion; a switching element that generates switching current flowing through the inductor; an inductor current detection circuit that detects current flowing through the inductor; and a switching control circuit that performs switching control of the switching element at a switching frequency in accordance with a result of detection by the inductor current detection circuit. The inductor current detection circuit includes a time constant circuit composed of a detection capacitor and a detection resistor that are connected in series to each other and is connected in parallel to the inductor. The detection capacitor is thermally affected in correlation with variation in temperature of the inductor. A CR product, which is a product of capacitance (C) of the detection capacitor in the time constant circuit and a resistance value (R) of the detection resistor therein, has certain equality relationship with values of inductance and equivalent series resistance of the inductor at a rated operating temperature. The time constant circuit has temperature characteristics of a time constant, in which the CR product is decreased with the increasing temperature from the rated operating temperature, and variation of the inductance of the inductor with respect to the temperature and variation of the equivalent series resistance of the inductor with respect to the temperature are compensated by the variation of the CR product with respect to the variation in temperature to keep the certain equality relationship from the rated operating temperature to a high temperature range. The inductor current detection circuit outputs a voltage between both ends of the detection capacitor as an electrical signal with which the current flowing through the inductor is detected.

The inductor has direct current superposition characteristics in which the inductance value is decreased with the decreasing permeability of a magnetic material when the current flowing through the inductor reaches current at which the magnetic material is magnetically saturated. Since the current at which the magnetic material is magnetically saturated is decreased with the increasing temperature, the inductance value is decreased even with a smaller amount of current.

In addition, the value of the equivalent series resistance of the inductor is varied with the variation in temperature depending on the temperature characteristics of the resistivity of a conductor. Specifically, the value of the equivalent series resistance is increased with the increasing temperature.

With the above configuration, even if the inductance of the inductor is decreased or the value of the equivalent series resistance of the inductor is increased with the increasing temperature, the variation of the inductance value and the variation of the equivalent series resistance of the inductor with respect to the variation in temperature are compensated by the variation of the CR product with respect to the variation in temperature. Accordingly, even when the temperature of the inductor is increased, the time constant of the time constant circuit keeps the certain equality relationship with the values of the inductance and the equivalent series resistance of the inductor.

Consequently, even if heat generation in the inductor, variation of the ambient temperature of the inductor, or the like occurs, the certain equality relationship is kept and reduction in the detection accuracy of the inductor current is small.

According to the present disclosure, a simple and compact switching power supply apparatus capable of keeping high current detection accuracy and realizing highly efficient power conversion is provided with a simple circuit configuration using a small number of components even if variation in input voltage or a load, variation in a switching frequency, heat generation in the inductor, variation of the ambient temperature of the inductor, or the like occurs.

DETAILED DESCRIPTION

Figure 1A:
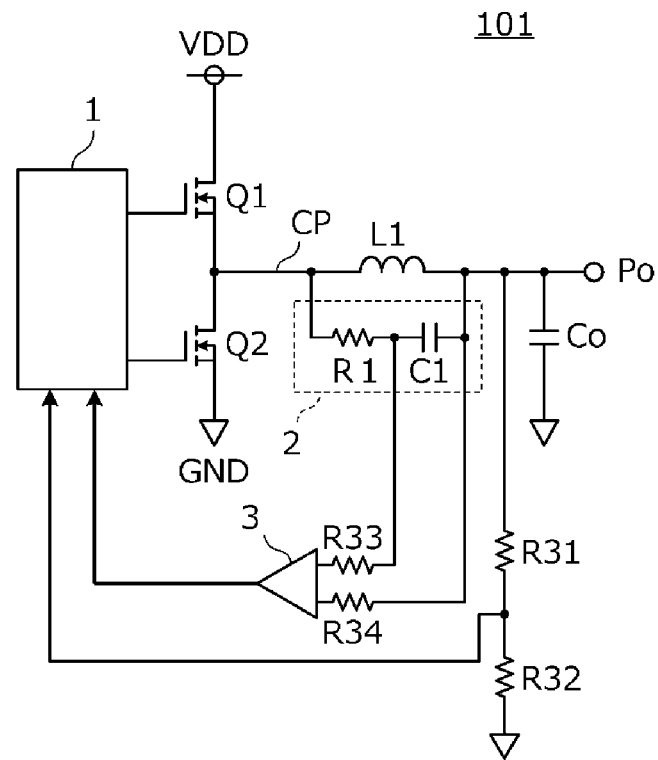
FIG. 1A and FIG. 1B are circuit diagrams of a switching power supply apparatus according to a first embodiment.

Multiple embodiments of the present disclosure will herein be described with reference to the drawings using several specific examples. The same reference numerals and letters are added to the same components in the respective drawings. Although the multiple embodiments are described for convenience of description in consideration of description of the points or easiness of understanding, partial replacement or combination of the components described in different embodiments is available. A description of matters common to a first embodiment is omitted and only points different from the first embodiment are described in a second embodiment and the subsequent embodiments. In particular, the same effects and advantages of the same components are not successively described in the respective embodiments.

First Embodiment

Figure 1B:
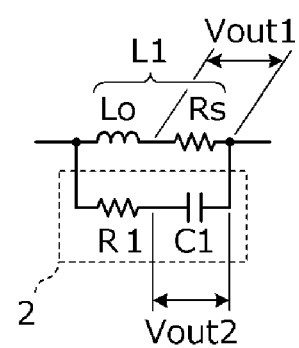

FIG. 1A and FIG. 1B are circuit diagrams of a switching power supply apparatus according to a first embodiment. A switching power supply apparatus 101 includes an inductor L1, a capacitor Co, switching elements Q1 and Q2, a switching control circuit 1, an inductor current detection circuit 2, a differential amplifier circuit 3, and resistive elements R31, R32, R33, and R34. VDD denotes a power supply voltage terminal and GND denotes a ground terminal.

The inductor L1 is connected in series to a current path CP through which current is supplied to an output portion Po. The capacitor Co is connected in parallel to the output portion Po (connected between a voltage output end of the output portion Po and ground). The switching elements Q1 and Q2 generate switching current flowing through the inductor L1. The switching control circuit 1 performs switching control of the switching elements Q1 and Q2. The inductor current detection circuit 2 detects current flowing through the inductor L1.

The switching control circuit 1 performs the switching control of the switching elements Q1 and Q2 so that output voltage from a resistance voltage dividing circuit composed of the resistive elements R31 and R32 is kept constant to stabilize the output voltage. In addition, the switching control circuit 1 performs the switching control of the switching elements Q1 and Q2 in accordance with inductor current described below.

The inductor current detection circuit 2 is composed of a time constant circuit including a detection capacitor C1 and a detection resistor R1 that are connected in series to each other. The inductor current detection circuit 2 is connected in parallel to the inductor L1.

The inductor current detection circuit 2 outputs the voltage between both ends of the detection capacitor C1 as a proportional value of the inductor current. The voltage between both ends of the detection capacitor C1 is supplied to the differential amplifier circuit 3 and voltage amplified by the differential amplifier circuit 3 is supplied to the switching control circuit 1.

FIG. 1B is a partial circuit diagram in which the inductor L1 is represented by inductance Lo and equivalent series resistance Rs. The time constant of the inductor current detection circuit 2 (of the time constant circuit) has certain equality relationship with the values of the inductance Lo and the equivalent series resistance Rs of the inductor L1. Equality relationship Lo/Rs=CtRt is established where the value of the inductance Lo is denoted by Lo, the resistance value of the equivalent series resistance Rs is denoted by Rs, the capacitance of the detection capacitor C1 is denoted by Ct, and the resistance value of the detection resistor R1 is denoted by Rt. Here, it may be said that Lo/Rs is the time constant of the inductor L1 and CtRt is the time constant of the inductor current detection circuit 2. In other words, if the resistance value Rt of the detection resistor R1 and the resistance value of the equivalent series resistance Rs of the inductor L1 are constant, the voltage between both ends of the detection capacitor C1 is proportional to the current flowing through the inductor L1 as described in U.S. Pat. No. 5,877,611. The detection capacitor C1 is thermally coupled to the inductor L1 and is thermally affected in correlation with the variation in temperature of the inductor L1. Specifically, the temperature of the detection capacitor C1 is varied with the temperature of the inductor L1.

The equivalent series resistance Rs has characteristics in which the resistance value is varied with the variation in frequency. In other words, the resistance value of the equivalent series resistance Rs is increased with the increasing frequency. The capacitance of the detection capacitor C1 also has characteristics in which the capacitance is varied with the variation in frequency. The detection capacitor C1 has characteristics in which the capacitance is decreased with the increasing frequency of applied voltage. Accordingly, Rs and Ct are varied in opposite directions with the variation in frequency to keep the equality relationship Lo/Rs=CtRt. Consequently, the certain equality relationship described above is kept in a wide frequency band from a switching frequency to a high frequency band and the output voltage from the inductor current detection circuit 2 (the voltage between both ends of the detection capacitor C1) is output as the proportional value of the inductor current with a proportionality coefficient being kept constant even if the waveform of the inductor current is varied.

Since the resistive elements R33 and R34 are connected in series to an input portion of the differential amplifier circuit 3 and the differential amplifier circuit 3 amplifies a small current detection signal, the differential amplifier circuit 3 is capable of detecting the inductor current with low loss.

Figure 2:
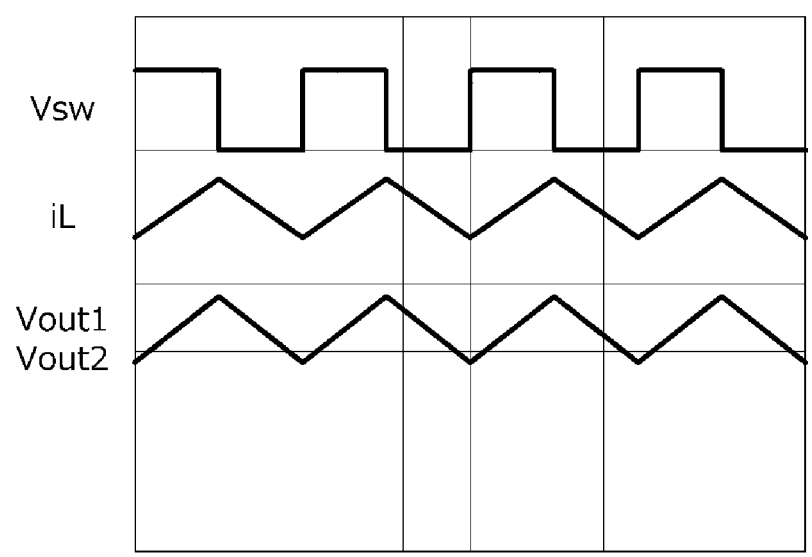
FIG. 2 is a waveform diagram resulting from voltage-current simulation of each component illustrated in FIG. 1B.

FIG. 2 is a waveform diagram resulting from voltage-current simulation of each component illustrated in FIG. 1B. Referring to FIG. 2, a waveform Vsw indicates the waveform of drain-source voltage of the low-side switching element Q2. A waveform iL indicates the waveform of the current flowing through the inductor L1. A waveform Vout1 indicates the waveform of the voltage between both ends of the equivalent series resistance Rs and a waveform Vout2 indicates the waveform of the output voltage from the inductor current detection circuit 2. The waveform Vout1 is completely overlapped with the waveform Vout2.

As indicated in FIG. 2, the inductor current is triangular waves and includes odd-number-order harmonics of third-order harmonics, fifth-order harmonics, seventh-order harmonics, ninth-order harmonics, . . . . Although the resistance value of the equivalent series resistance Rs is varied with the variation in frequency of the current flowing through the inductor, the equality relationship Lo/Rs=CtRt is kept due to variation of the capacitance of the detection capacitor C1 with the variation in frequency, as described below. Accordingly, the output voltage from the inductor current detection circuit 2 (the voltage between both ends of the detection capacitor C1) is output as the proportional value of the inductor current with the proportionality coefficient being kept constant even if the waveform of the inductor current is varied without being affected by variation of the magnitudes or the ratio of the frequency components in the frequency band higher than the switching frequency.

The relationship between the frequency characteristics of the resistance value of the equivalent series resistance of the inductor L1 and the frequency characteristics of the capacitance of the detection capacitor C1 will now be described.

Figure 3A:
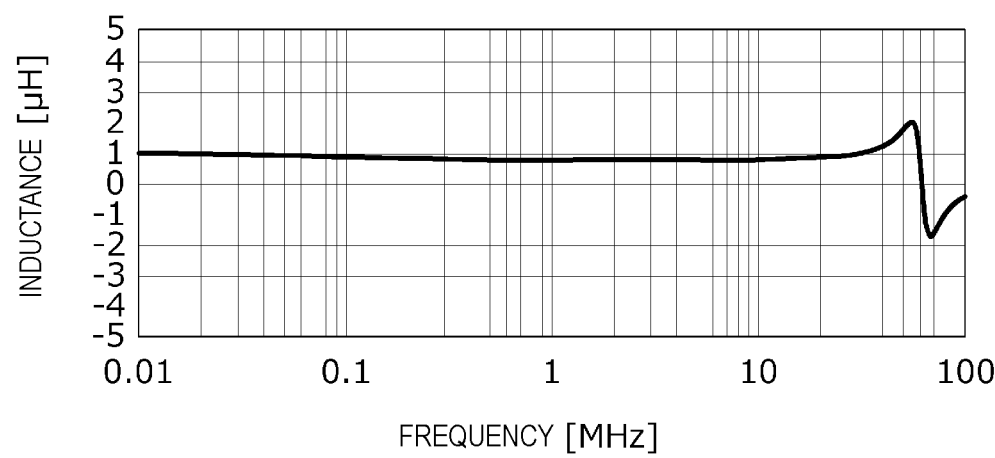
FIG. 3A is a graph indicating a change characteristic of an inductance component (Lo illustrated in FIG. 1B of an inductor L1 with respect to the frequency, and FIG. 3B is a graph indicating an alternating-current resistance characteristic of the inductor L1 (a change characteristic of equivalent series resistance Rs with respect to the frequency)
Figure 3B:
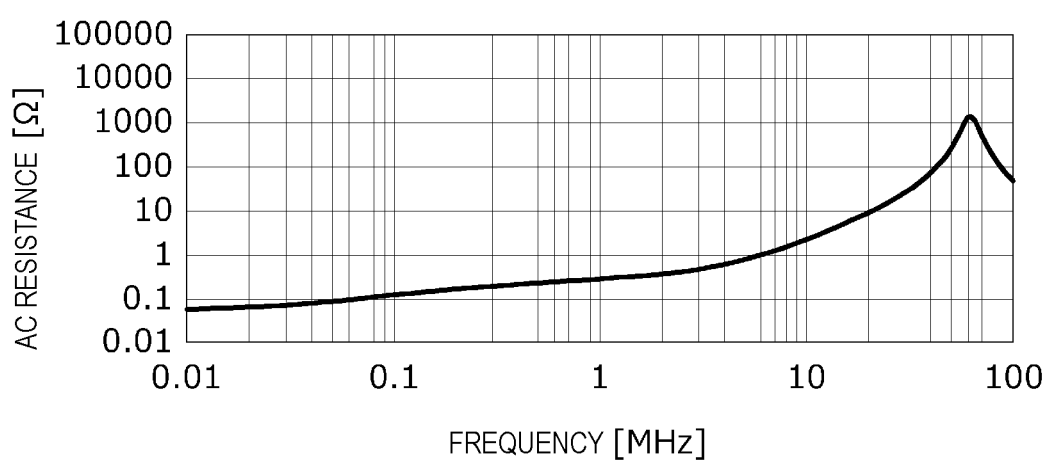

FIG. 3A is a graph indicating a frequency characteristic of the inductance component (Lo illustrated in FIG. 1B) of the inductor L1. FIG. 3B is a graph indicating an alternating-current resistance characteristic of the inductor L1 (the frequency characteristic of the equivalent series resistance Rs). The inductance component of the inductor L1 has a small variation with respect to the variation in frequency and is kept constant to a frequency of 40 MHz. In contrast, the value of the equivalent series resistance is increased with the increasing frequency. This is because the equivalent series resistance has iron loss (hysteresis loss and eddy current loss) and these loss terms are increased with the increasing frequency.

Figure 4:
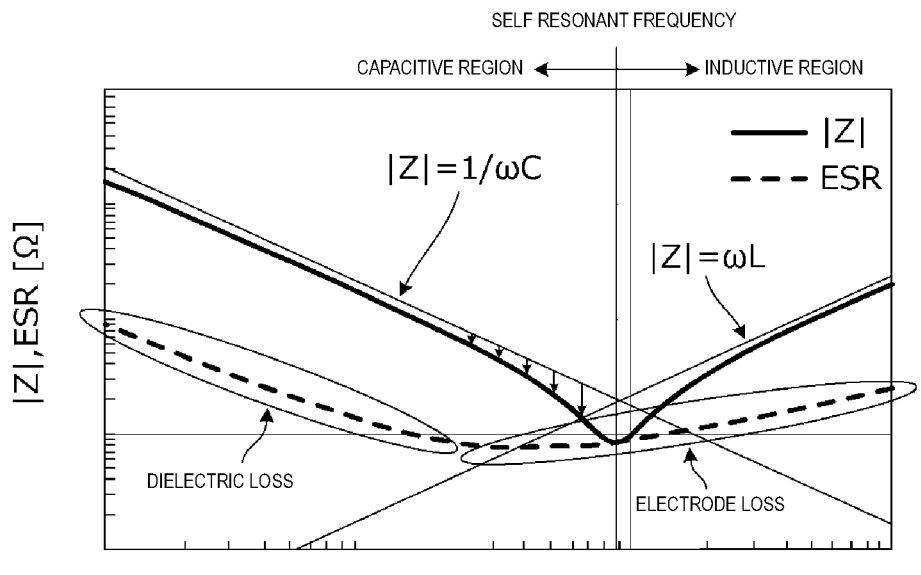
FIG. 4 is a graph indicating characteristics of a multilayer ceramic capacitor with respect to the frequency when the multilayer ceramic capacitor is used as a detection capacitor C1.

FIG. 4 is a graph indicating characteristics of a multilayer ceramic capacitor with respect to the frequency when the multilayer ceramic capacitor is used as the detection capacitor C1. Referring to FIG. 4, a bold solid line indicates impedance |Z| of the detection capacitor C1 and a broken line indicates equivalent series resistance ESR. The impedance |Z| has a gradient of $1/\omega C$ in a frequency band lower than a self-resonant frequency and has a gradient of $\omega L$, in a frequency band higher than the self-resonant frequency. Here, C denotes the capacitance of the detection capacitor C1 and L denotes a parasitic inductance component of the detection capacitor C1. The equivalent series resistance ESR is increased in a low frequency region and a high frequency region.

The reasons for the above characteristics will now be described.

[Low Frequency Region]

|Z| in a low frequency region is decreased in reverse proportion to the frequency, like an ideal capacitor. ESR has a value corresponding to dielectric loss caused by a delay of polarization of a dielectric body.

[Near Resonance Point]

As the frequency is increased, the behavior of |Z| is shifted from the characteristic (a gradient of $1/\omega C$) of the ideal capacitor due to the influence of ESR caused by the parasitic inductance, specific resistance of an electrode, or the like and exhibits a local minimum value. At the self-resonant frequency at which |Z| has the local minimum value, |Z|=ESR. At frequencies exceeding the self-resonant frequency, the feature of the element is changed from the capacitor to the inductor and |Z| is increased. A region lower than the self-resonant frequency is a capacitive region and a region higher than the self-resonant frequency is an inductive region. ESR is influenced by loss caused by the electrode, in addition to the dielectric loss.

[High Frequency Region]

In the frequency region higher than the resonance point, the characteristic of |Z| is determined by the parasitic inductance (L). |Z| in the high frequency region is increased in proportion to the frequency. ESR is influenced by a skin effect and a proximity effect of the electrode.

The multilayer ceramic capacitor is excellent in high frequency characteristics and, in terms of the structure, has impedance characteristics in which the equivalent series resistance and equivalent series inductance (ESL) are lower than those of other capacitors. Although an aluminum electrolytic capacitor and a tantalum electrolytic capacitor have high impedances because of their high ESR components, the impedance of the ceramic capacitor is decreased with the increasing frequency.

The difference between the impedance |Z| of the detection capacitor C1 and the characteristic (a gradient of $1/\omega C$) of the ideal capacitor is increased with the increasing frequency to the self-resonant frequency. In other words, the capacitance of the multilayer ceramic capacitor, which is the detection capacitor C1, has frequency characteristics in which the capacitance is decreased with the increasing frequency of the applied voltage. Specifically, the variation in capacitance of the detection capacitor C1 has a negative gradient with respect to the variation in frequency thereof.

Appropriately selecting the frequency characteristics of the capacitance of the detection capacitor C1 in the above manner compensates the variation of the resistance value of the equivalent series resistance of the inductor L1 with respect to the frequency by the variation of the capacitance of the detection capacitor C1 with respect to the frequency to keep the equality relationship Lo/Rs=CtRt from the switching frequency to the high frequency band.

Next, the relationship between temperature characteristics of the inductance value and the equivalent series resistance Rs of the inductor L1 and temperature characteristics of the capacitance of the detection capacitor C1 will now be described.

Figure 5:
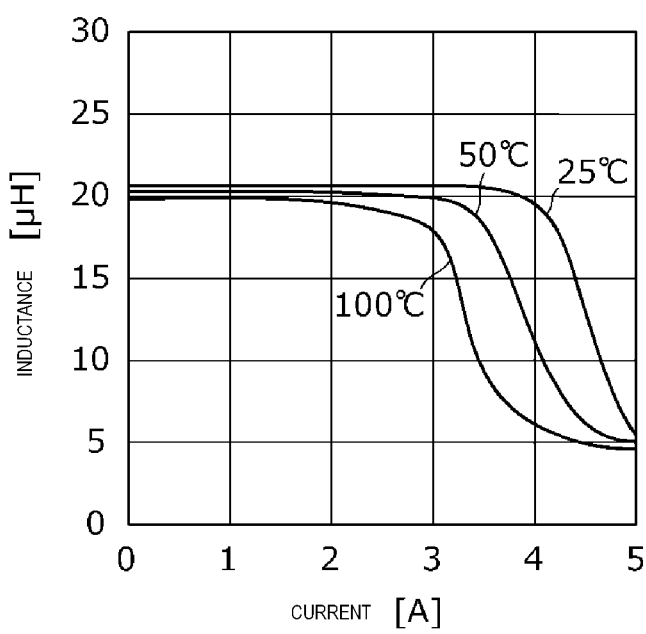
FIG. 5 is a graph indicating temperature characteristics of an inductance value with respect to inductor current.

FIG. 5 is a graph indicating the temperature characteristics of the inductance value with respect to the inductor current. The inductance value of the inductor is decreased with the decreasing permeability of a magnetic material when the current flowing through the inductor reaches current at which the magnetic material is magnetically saturated. In the example illustrated in FIG. 5, the magnetic material is started to be magnetically saturated at about 3.3 A or more at 50° C. and the inductance value of the inductor is decreased with the increasing current. Such direct current superposition characteristics are varied with the temperature. In other words, since the current at which the magnetic material is magnetically saturated is decreased with the increasing temperature, the inductance value is decreased even with a smaller amount of current, as indicated in FIG. 5.

In addition, the value of the equivalent series resistance of the inductor is varied with the variation in temperature depending on the temperature characteristics of the resistivity of a conductor. Specifically, the value of the equivalent series resistance is increased with the increasing temperature. In addition, not only the resistance value of a direct-current component but also the resistance value of an alternating-current component are increased with the increasing temperature.

Figure 6:
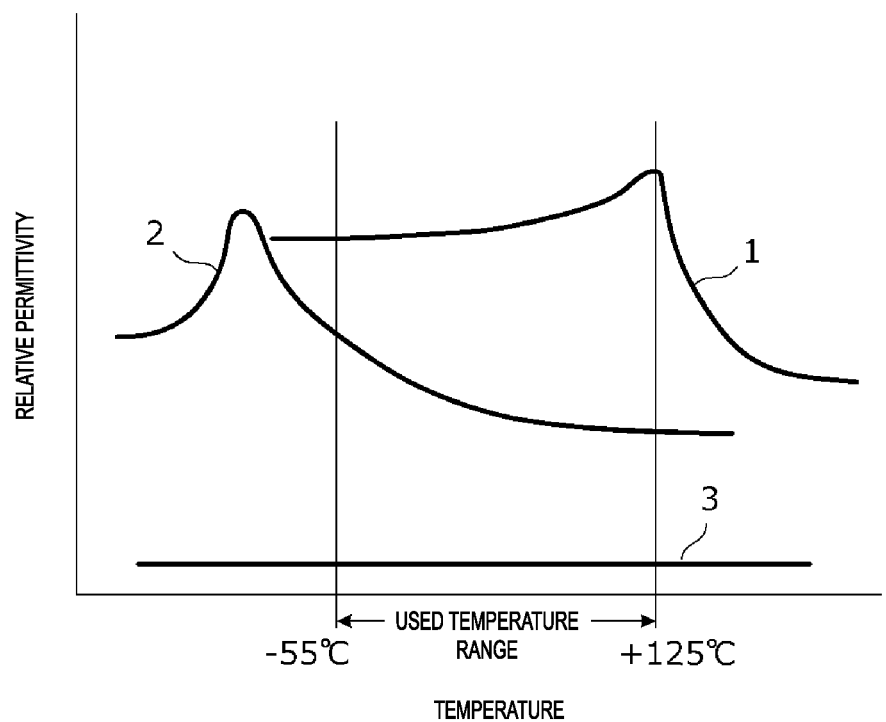
FIG. 6 is a graph indicating temperature characteristics of the multilayer ceramic capacitors of three kinds, which are indicated by 1, 2, and 3, with respect to relative permittivity.

FIG. 6 is a graph indicating the temperature characteristics of the multilayer ceramic capacitors of three kinds, which are indicated by characteristic curves 1, 2, and 3, with respect to relative permittivity. The temperature at which the relative permittivity is peaked is a Curie point in FIG. 6. The dielectric materials forming the multilayer ceramic capacitors are roughly classified into the following three kinds.

(1) The high-permittivity dielectric material having high electrostatic capacitance because the dielectric material has ferroelectricity (is in a ferroelectric phase) in its used temperature range. For example, the dielectric material having a $BaTiO_3$ based core shell structure. The relative permittivity is several hundreds to several thousands.

(2) The low-permittivity dielectric material with low loss, which has low permittivity and a small hysteresis loop because the dielectric material does not have the ferroelectricity (is in a paraelectric phase) in its used temperature range. For example, the dielectric material having a $BaTiO_3$ based uniform structure. The relative permittivity is several tens.

(3) The dielectric material for a temperature compensation capacitor, which has an extremely low permittivity, which exhibits little variation with temperature, and which has low loss.

The temperature coefficient of the resistance of a copper winding composing the inductor L1 is 3,930 ppm/° C. For example, the resistance value is increased by 30% in response to an increase of the temperature of the winding from 25° C. to 100° C. As described above, the inductor L1 has characteristics in which the equivalent series resistance ESR is greatly varied with the variation in temperature. Some inductors use windings made of manganin-copper alloy. The manganin-copper alloy normally contains copper of 86%, manganese of 12%, and nickel of 2%. Although the manganin-copper alloy has an advantage of having the temperature coefficient of substantially zero, the available range of the inductors is highly limited. In addition, the winding made of the manganin-copper alloy has a conductivity lower than that of the winding made of copper and has a power loss higher than that of the winding made of copper. In addition, the inductor is increased in size.

As described above, when the inductor is used, the inductance value of which is decreased with the increase in temperature and the equivalent series resistance and the alternating-current resistance of which are increased with the increase in temperature, a capacitor having characteristics in which the capacitance is decreased with the increasing temperature is used as the detection capacitor C1. In the example illustrated in FIG. 6, the capacitor, which is indicated by the characteristic curve 2, which has a small hysteresis loop, and which is made of the low-permittivity dielectric material with low loss, is appropriate for the detection capacitor C1.

The impedance |Z| of the detection capacitor C1 is increased with the increasing temperature. In other words, the capacitance of the multilayer ceramic capacitor, which is the detection capacitor C1, has temperature characteristics in which the capacitance is decreased with the increasing temperature. Specifically, the variation in capacitance of the detection capacitor C1 has a negative gradient with respect to the variation in temperature thereof.

The multilayer ceramic capacitor, which is indicated by the characteristic curve 2 in FIG. 6 and which is made of the low-permittivity dielectric material with low loss, is appropriately used as the detection capacitor C1 in the description with reference to FIG. 6. However, the multilayer ceramic capacitor, which is indicated by the characteristic curve 1 in FIG. 6 and which is made of the high-permittivity dielectric material having high electrostatic capacitance, is used when the capacitance is intended to be greatly varied with the variation in temperature, and the multilayer ceramic capacitor, which is indicated by the characteristic curve 3 in FIG. 6 and which is made of the low-permittivity dielectric material with low loss, is used when the capacitance is intended not to be much varied with the variation in temperature. In other words, appropriately selecting the kind of the capacitor based on the dielectric material of the multilayer ceramic capacitor used for the detection capacitor and combining the capacitors, if needed, enable a desired variation in capacitance to be designed with respect to the variation in temperature.

Appropriately selecting and designing the temperature characteristics of the capacitance of the detection capacitor C1 in the above manner compensates the variation of the inductance value Lo and the equivalent series resistance value Rs of the inductor L1 with respect to the frequency by the variation of the detection capacitor C1 with respect to the temperature to keep the equality relationship Lo/Rs=CtRt in a wide temperature range.

The time constant of the inductor current detection circuit 2 is also varied with the temperature characteristics of the resistance value of the detection resistor RE The detection resistor R1 is thermally coupled to the inductor L1 and is thermally affected in correlation with the variation in temperature of the inductor L1. Specifically, the resistance value of the detection resistor R1 is varied with the temperature of the inductor L1. The change characteristics of the time constant of the inductor current detection circuit 2 with respect to the temperature are capable of being determined based on the change characteristics of the detection capacitor C1 with respect to the temperature and the change characteristics of the detection resistor R1 with respect to the temperature.

Although the example is illustrated in FIG. 1A and FIG. 1B, in which the inductor current detection circuit 2 includes the detection resistor R1, which has no variation of the resistance value with respect to the variation in temperature or which does not use the variation of the resistance value with respect to the variation in temperature, the detection resistor R1 may have characteristics in which the resistance value is varied with the temperature, in addition to the detection capacitor C1.

Although the example is illustrated in FIG. 1A and FIG. 1B, in which the time constant circuit of the inductor current detection circuit 2 includes the single detection resistor R1, the time constant circuit including multiple resistive elements may be composed.

Figure 7A:
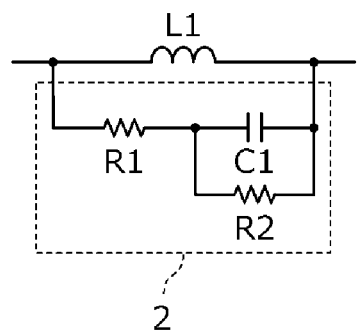
FIG. 7A is a partial circuit diagram in which a detection resistor, a resistive element, and the detection capacitor compose an inductor current detection circuit.

FIG. 7A is a partial circuit diagram in which the detection resistor R1, a resistive element R2, and the detection capacitor C1 compose the inductor current detection circuit 2. The resistance value of the resistive element R2 is higher than the resistance value of the detection resistor R1. Although the time constant of the inductor current detection circuit 2 is mainly determined by the resistance value of the detection resistor R1 and the capacitance of the detection capacitor C1, the time constant of the inductor current detection circuit 2 is capable of being fine-tuned using the resistance value of the resistive element R2.

Figure 7B:
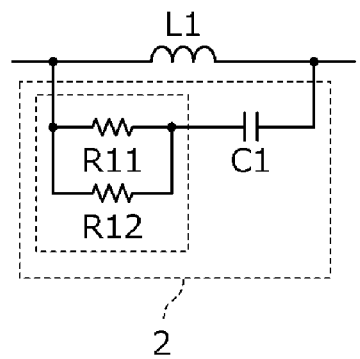
FIG. 7B and FIG. 7C are partial circuit diagrams in which detection resistors and the detection capacitor compose the inductor current detection circuit.
Figure 7C:
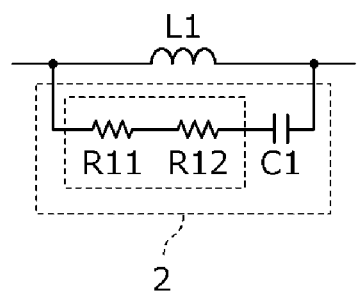

FIG. 7B and FIG. 7C are partial circuit diagrams in which detection resistors R11 and R12 and the detection capacitor C1 compose the inductor current detection circuit 2. The detection resistors R11 and R12 are connected in parallel to each other in the example illustrated in FIG. 7B while the detection resistors R11 and R12 are connected in series to each other in the example illustrated in FIG. 7C. One of the detection resistors R11 and R12 is the resistive element having the change characteristics of the resistance value with respect to the temperature. Accordingly, the combined resistance value of the detection resistors R11 and R12 has characteristics varied with the temperature. For example, the detection resistor R11 is a normal resistive element and the detection resistor R12 is a thermistor having a negative temperature coefficient.

Combining the resistive element having the characteristics in which the resistance value is varied with the temperature with the resistive element having the characteristics in which the resistance value is not varied with the temperature in the above manner enables the change characteristics of the time constant of the inductor current detection circuit 2 with respect to the temperature to be appropriately determined.

Second Embodiment

In a second embodiment, an example of a power system is described, which is configured so that the inductor current of each cell converter is detected to attain current balancing in a switching power supply apparatus having a multicell converter configuration.

Figure 8:
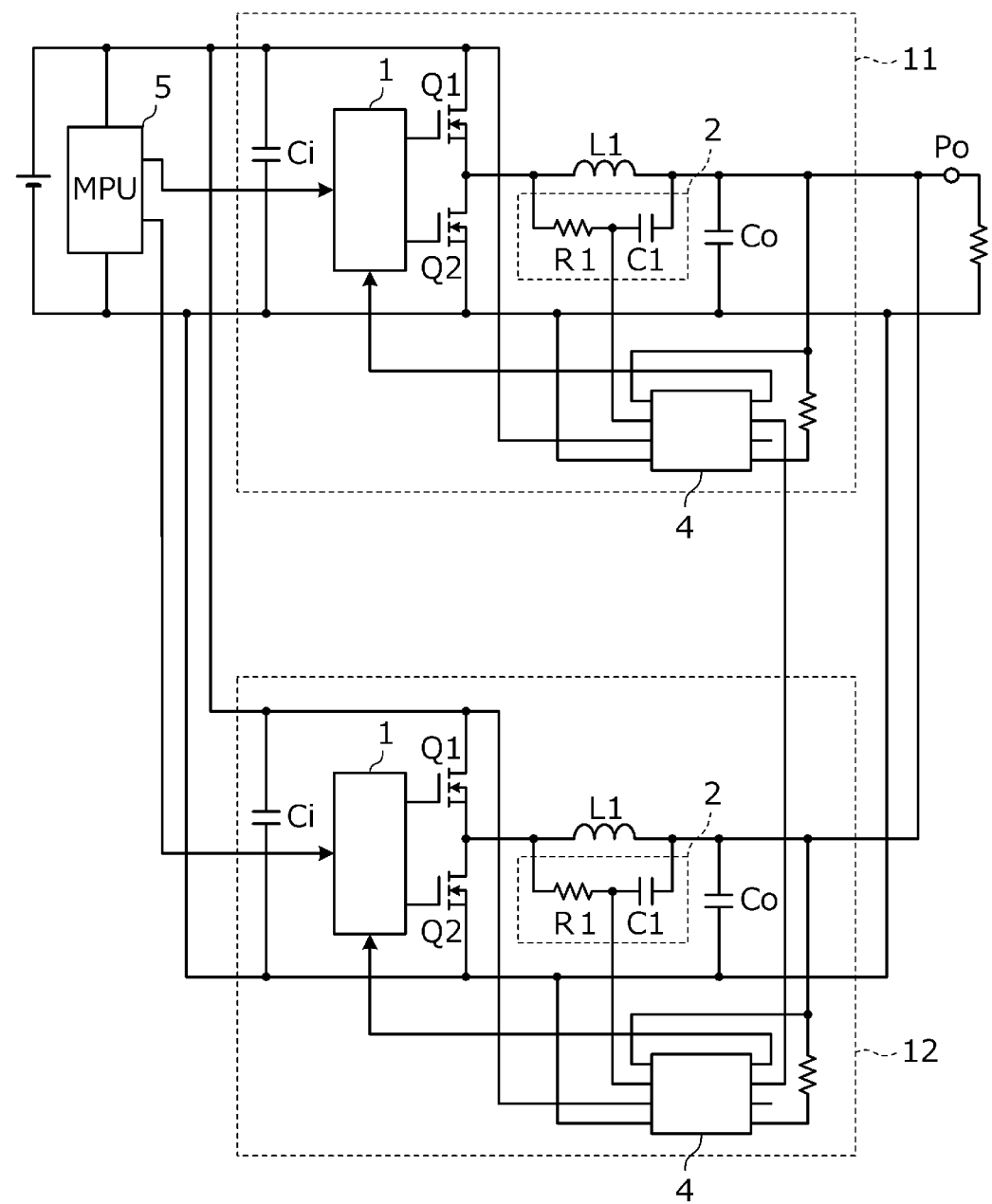
FIG. 8 is a circuit diagram of a power system according to a second embodiment.

FIG. 8 is a circuit diagram of the power system according to the second embodiment. This power system includes two cell converters 11 and 12 and a microprocessor 5 controlling the cell converters 11 and 12. The cell converters 11 and 12 each include the inductor L1, a capacitor Ci, the capacitor Co, the switching elements Q1 and Q2, the switching control circuit 1, the inductor current detection circuit 2, and a load balancing controller 4.

The load balancing controller 4 detects voltage at the output portion Po and supplies a feedback signal to the switching control circuit 1 so that the output voltage has a certain value. The two load balancing controllers 4 are connected to each other with a current sharing signal line (current share bus) CSB and supply the feedback signals to the corresponding switching control circuits 1 so that the load factor of the cell converter 11 is equal to that of the cell converter 12. In other words, the load balancing controllers 4 receive the output voltages from the corresponding inductor current detection circuits 2 and supply the feedback signals to the corresponding switching control circuits 1 so that the inductor currents of the two cell converters 11 and 12 are equal to each other.

Although the power system including the two cell converters 11 and 12 is illustrated in the example in FIG. 8, the same applies to a case in which the power system include three or more cell converters.

Figure 9:
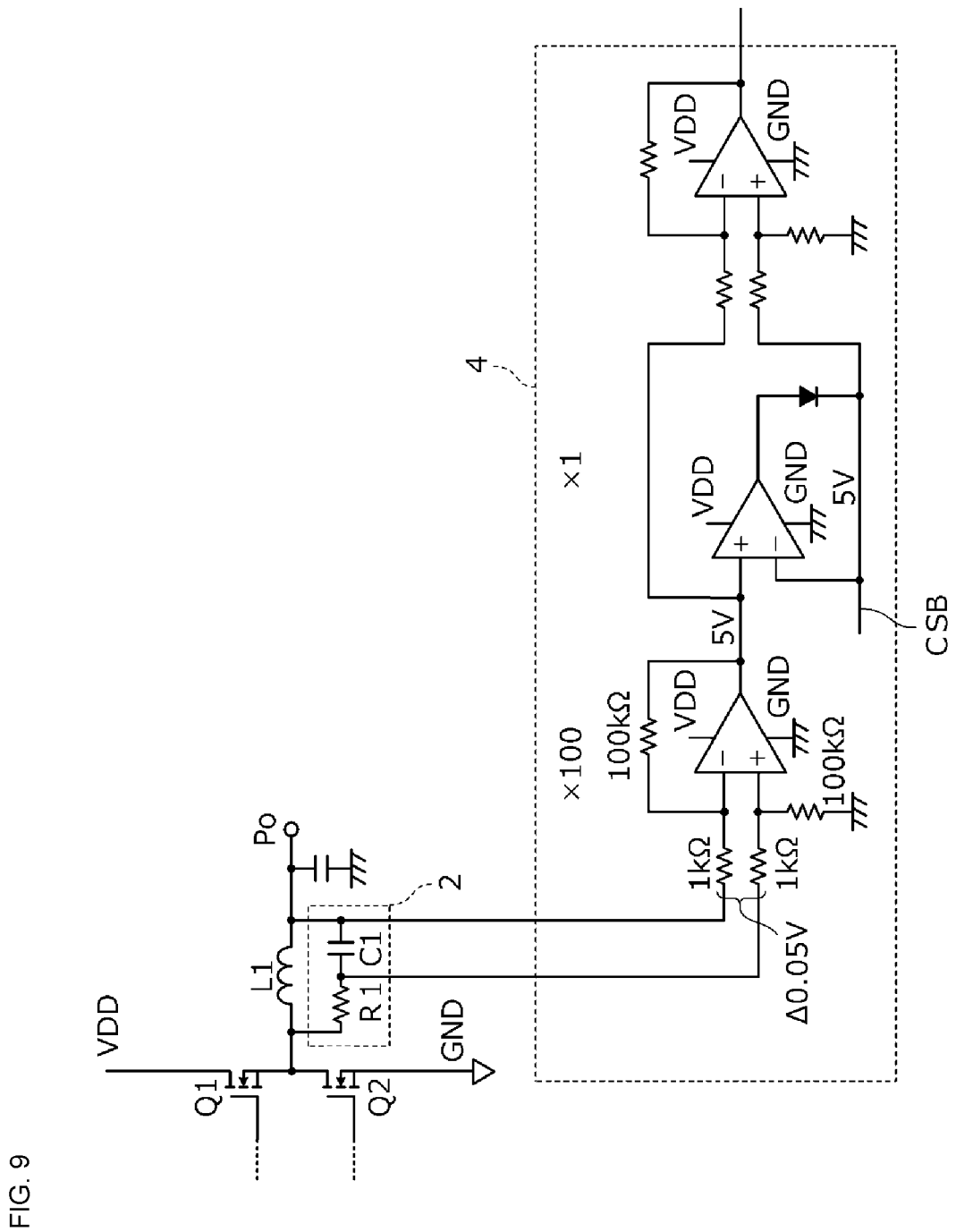
FIG. 9 is a circuit diagram of a portion where amplification and current sharing are performed in a load balancing controller illustrated in FIG. 8.

FIG. 9 is a circuit diagram of a portion where amplification and current sharing are performed in the load balancing controller 4 illustrated in FIG. 8. A first-stage amplifier circuit voltage-amplifies an output signal from the inductor current detection circuit 2 one hundredfold, and second-stage and third-stage amplifier circuits detect the difference between the voltage of the output signal and the voltage of the current sharing signal line (current share bus) CSB. This voltage is fed back to the switching control circuit 1.

Since the inductor current of each cell converter is detected with high accuracy in the power system including the multiple cell converters performing load balancing in the above manner, the load balancing is appropriately performed.

Third Embodiment

In a third embodiment, an example of a power system is described, which is configured so that the inductor current of each cell converter is detected to attain current balancing in a switching power supply apparatus having a multiphase converter configuration.

Figure 10:
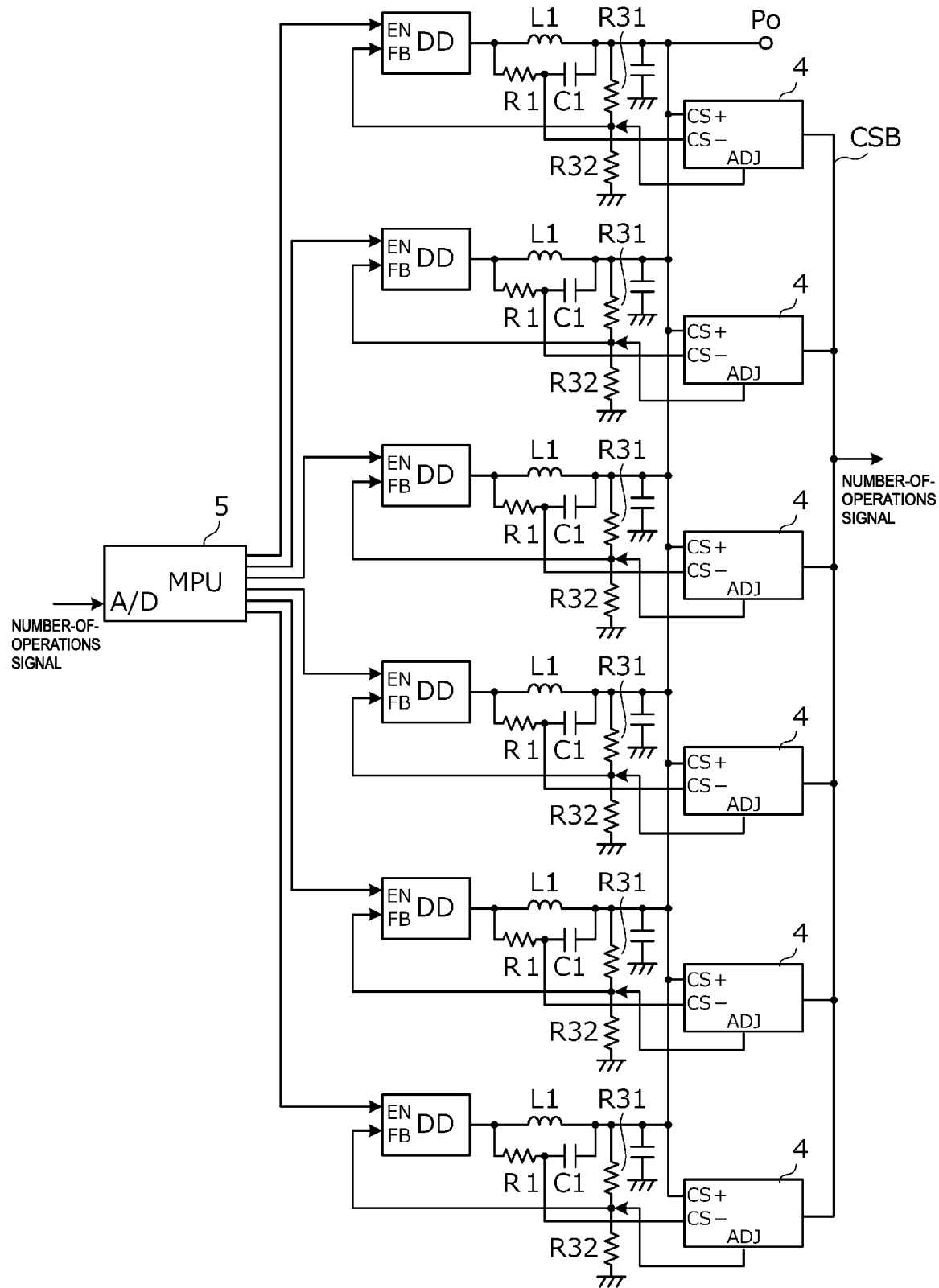
FIG. 10 is a circuit diagram of a power system according to a third embodiment.

FIG. 10 is a circuit diagram of the power system according to the third embodiment. This power system includes six cell converters and the microprocessor 5 controlling the six cell converters. Each cell converter includes a switching circuit DD, the load balancing controller 4, the resistive elements R31 and R32, the inductor L1, and an inductor current detection circuit composed of the detection resistor R1 and the detection capacitor C1. The switching circuit DD is composed of a switching element and a switching control circuit. The switching circuit DD performs a switching operation when an enable signal input into an enable signal terminal EN is valid and stops the switching operation when the enable signal is invalid. The microprocessor 5 includes an analog-to-digital (A/D) converter. The microprocessor 5 receives a number-of-operations signal, which is an analog signal, to convert the number-of-operations signal into a digital value, determines the number of the cell converters to be operated in accordance with the number of operations, and supplies a multi-phase oscillation signal to the cell converters. The current sharing signal line CSB for the load balancing controller 4 has voltage corresponding to the number of the operating cell converters.

The load balancing controller 4 receives the voltage between both ends of the detection capacitor C1 through current share terminals CS+ and CS−, generates a current feedback signal in accordance with the magnitude of the current flowing through the inductor L1 and the voltage of the current sharing signal line CSB, and applies the current feedback signal to the resistance voltage dividing circuit composed of the resistive elements R31 and R32. The switching circuit DD has a feedback signal input terminal FB. A combined feedback signal resulting from combination of a voltage feedback signal and the current feedback signal is input into the feedback signal input terminal FB of the switching circuit DD.

The output voltage from the resistance voltage dividing circuit is decreased (current flows from the resistance voltage dividing circuit to a feedback signal adjustment terminal (ADJ)) with the current feedback signal as the load factor of the corresponding cell converter is lower than those of the other cell converters. For example, when only the voltage feedback signal from the resistance voltage dividing circuit composed of the resistive elements R31 and R32 is fed back to the switching circuit DD, constant voltage control is performed so that specified voltage is output from the output portion Po. However, feeding back the combined feedback signal to the switching circuit DD decreases the voltage of the combined feedback signal as the load factor of the corresponding cell converter is decreased to increase the output current from the cell converter to the output portion Po.

Feeding back the combined feedback signal in the above manner equalizes the load factors of the operating cell converters.

Figure 11:
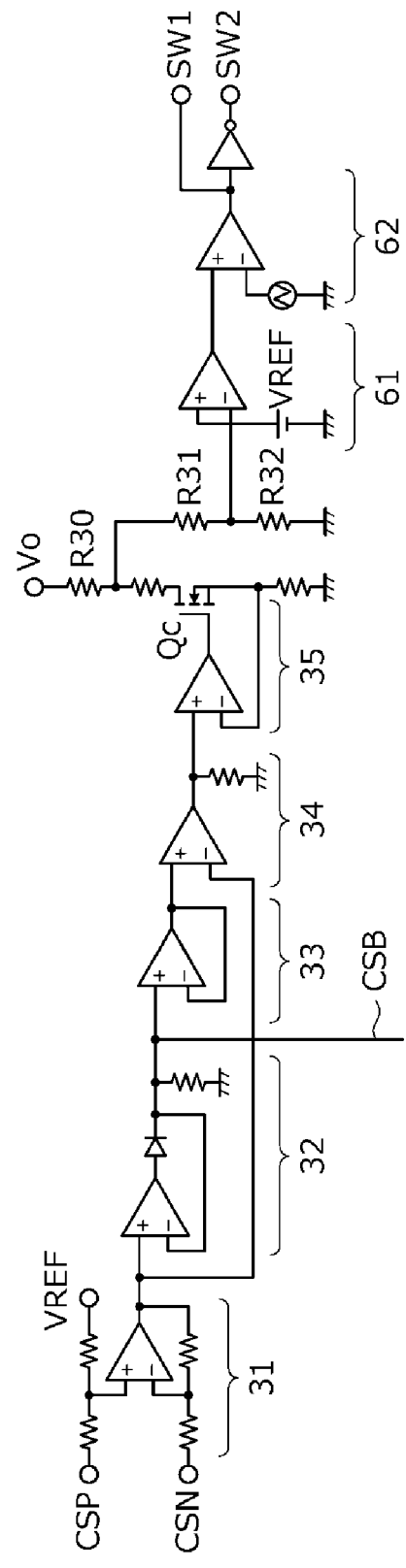
FIG. 11 is a circuit diagram illustrating another configuration example of a portion including the load balancing controller, a switching circuit, and resistive elements illustrated in FIG. 10.

FIG. 11 is a circuit diagram illustrating another configuration example of the portion including the load balancing controller 4, the switching circuit DD, and the resistive elements R31 and R32 illustrated in FIG. 10. Referring to FIG. 11, Vo denotes a power supply voltage terminal and VREF denotes a reference voltage generation circuit.

Referring to FIG. 11, CSP and CSN are connected to both ends of the detection capacitor C1. The voltage between both ends is amplified by a current detection amplifier 31 and is amplified by a current share bus driver 32. A current share bus receiver 33 receives the voltage of the current sharing signal line (current share bus) CSB at high impedance. A current error amplifier 34 amplifies the difference between the output voltage from the current detection amplifier 31 and the voltage of the current sharing signal line CSB. An adjustment amplifier 35 applies gate voltage corresponding to the output voltage from the current error amplifier 34 to a field-effect transistor (FET) Qc. Accordingly, the current feedback signal and the voltage feedback signal are combined in a circuit composed of a resistive element R30, the resistive elements R31 and R32, the FET Qc, and so on.

A voltage error amplifier 61 amplifies the difference between the voltage of the resistive element R32 and the reference voltage. A pulse width modulation (PWM) comparator 62 compares the output voltage from the voltage error amplifier 61 with the triangular waves to generate a PWM signal. Signals SW1 and SW2 are applied to the gates of the high-side switching element and the low-side switching element.

Adding the voltage proportional to the current of the inductor L1 to detected voltage of the output voltage in the above manner equalizes the load factors of the operating cell converters.

Finally, the description of the above embodiments is only an example and the present disclosure is not limited to the above embodiments. Modifications or changes may be appropriately made by the person skilled in the art. The scope of the present disclosure is not indicated by the above embodiments but is indicated by the scope of the claims. Changes from the embodiments within a range equivalent to the scope of the claims are included in the scope of the present disclosure.

What is claimed is:

1. A switching power supply apparatus comprising:
   an inductor that is connected in series to a current path configured through which to supply current to an output portion;
   a capacitor that is connected in parallel to the output portion;
   a switching element configured to generate switching current flowing through the inductor;
   an inductor current detection circuit configured to detect current flowing through the inductor; and
   a switching control circuit configured to perform switching control of the switching element at a switching frequency in accordance with a result of detection by the inductor current detection circuit,
   wherein
   the inductor current detection circuit includes a time constant circuit composed of a detection capacitor and a detection resistor that are connected in series to each other, and the inductor current detection circuit is connected in parallel to the inductor,
   a CR product, which is a product of capacitance of the detection capacitor in the time constant circuit and a resistance value of the detection resistor therein, has certain equality relationship with values of inductance and equivalent series resistance of the inductor at the switching frequency,
   the detection capacitor has frequency characteristics in which the capacitance is decreased with the increasing frequency from the switching frequency, and variation of the resistance value of the equivalent series resistance with respect to the frequency is compensated by the variation in capacitance with respect to the variation in frequency to keep the certain equality relationship from the switching frequency to a high frequency band, and
   the inductor current detection circuit is configured to output a voltage between both ends of the detection capacitor as an electrical signal with which the current flowing through the inductor is detected.

2. The switching power supply apparatus according to claim 1, wherein
   the inductor current detection circuit includes a differential amplifier circuit having a two-terminal input portion electrically connected to both ends of the detection capacitor, and
   at least one resistor is connected in series to an input path of an electrical signal to be supplied to the two-terminal input portion.

3. The switching power supply apparatus according to claim 1, wherein
   the certain equality relationship is Lo/Rs=the CR product where the inductance of the inductor is denoted by Lo and the resistance value of the equivalent series resistance is denoted by Rs.

4. The switching power supply apparatus according to claim 1, wherein
   the detection capacitor is a multilayer ceramic capacitor, the variation in capacitance of the multilayer ceramic capacitor having a negative gradient with respect to the variation in frequency of the multilayer ceramic capacitor.

5. The switching power supply apparatus according to claim 1, wherein
   the detection capacitor includes a high-permittivity dielectric body that has ferroelectricity in its used temperature range and that has high permittivity.

6. The switching power supply apparatus according to claim 1, wherein
   the detection capacitor includes a low-permittivity dielectric body that does not have ferroelectricity in its used temperature range and that has a small applied voltage-permittivity hysteresis loop.

7. The switching power supply apparatus according to claim 1, wherein
   the detection capacitor is a temperature compensation capacitor having variation in permittivity in its used temperature range, which is lower than a rate of change of a low-permittivity dielectric body.

8. The switching power supply apparatus according to claim 2, wherein
   the certain equality relationship is Lo/Rs=the CR product where the inductance of the inductor is denoted by Lo and the resistance value of the equivalent series resistance is denoted by Rs.

9. The switching power supply apparatus according to claim 2, wherein
   the detection capacitor is a multilayer ceramic capacitor, the variation in capacitance of the multilayer ceramic capacitor having a negative gradient with respect to the variation in frequency of the multilayer ceramic capacitor.

10. The switching power supply apparatus according to claim 3, wherein
    the detection capacitor is a multilayer ceramic capacitor, the variation in capacitance of the multilayer ceramic capacitor having a negative gradient with respect to the variation in frequency of the multilayer ceramic capacitor.

11. The switching power supply apparatus according to claim 2, wherein
the detection capacitor is a multilayer ceramic capacitor, the variation in capacitance of the multilayer ceramic capacitor having a negative gradient with respect to the variation in temperature of the multilayer ceramic capacitor.

12. The switching power supply apparatus according to claim 3, wherein
the detection capacitor is a multilayer ceramic capacitor, the variation in capacitance of the multilayer ceramic capacitor having a negative gradient with respect to the variation in temperature of the multilayer ceramic capacitor.

13. A switching power supply apparatus comprising:
an inductor that is connected in series to a current path configured through which to supply current to an output portion;
a capacitor that is connected in parallel to the output portion;
a switching element configured to generate switching current flowing through the inductor;
an inductor current detection circuit configured to detect current flowing through the inductor; and
a switching control circuit configured to perform switching control of the switching element at a switching frequency in accordance with a result of detection by the inductor current detection circuit,
wherein
the inductor current detection circuit includes a time constant circuit composed of a detection capacitor and a detection resistor that are connected in series to each other, and the inductor current detection circuit is connected in parallel to the inductor,
the detection capacitor is thermally affected in correlation with variation in temperature of the inductor,
a CR product, which is a product of capacitance of the detection capacitor in the time constant circuit and a resistance value of the detection resistor therein, has certain equality relationship with values of inductance and equivalent series resistance of the inductor at a rated operating temperature,
the time constant circuit has temperature characteristics of a time constant, in which the CR product is decreased with the increasing temperature from the rated operating temperature, and variation of the inductance of the inductor with respect to the temperature and variation of the equivalent series resistance of the inductor with respect to the temperature are compensated by the variation of the CR product with respect to the variation in temperature to keep the certain equality relationship from the rated operating temperature to a high temperature range, and the inductor current detection circuit outputs a voltage between both ends of the detection capacitor as an electrical signal with which the current flowing through the inductor is detected.

14. The switching power supply apparatus according to claim 13, wherein
the detection capacitor is a multilayer ceramic capacitor, the variation in capacitance of the multilayer ceramic capacitor having a negative gradient with respect to the variation in temperature of the multilayer ceramic capacitor.

15. The switching power supply apparatus according to claim 14, wherein
the resistance value of the detection resistor has characteristics varied with the variation in temperature and the detection resistor is thermally affected in correlation with the variation in temperature of the inductor.

16. The switching power supply apparatus according to claim 13, wherein
the inductor current detection circuit includes a differential amplifier circuit having a two-terminal input portion electrically connected to both ends of the detection capacitor, and
at least one resistor is connected in series to an input path of an electrical signal to be supplied to the two-terminal input portion.

17. The switching power supply apparatus according to claim 13, wherein
the certain equality relationship is $Lo/Rs$=the CR product where the inductance of the inductor is denoted by $Lo$ and the resistance value of the equivalent series resistance is denoted by $Rs$.

18. The switching power supply apparatus according to claim 13, wherein
the detection capacitor includes a high-permittivity dielectric body that has ferroelectricity in its used temperature range and that has high permittivity.

19. The switching power supply apparatus according to claim 13, wherein
the detection capacitor includes a low-permittivity dielectric body that does not have ferroelectricity in its used temperature range and that has a small applied voltage-permittivity hysteresis loop.

20. The switching power supply apparatus according to claim 13, wherein
the detection capacitor is a temperature compensation capacitor having variation in permittivity in its used temperature range, which is lower than a rate of change of a low-permittivity dielectric body.

* * * * *